Figure 1:
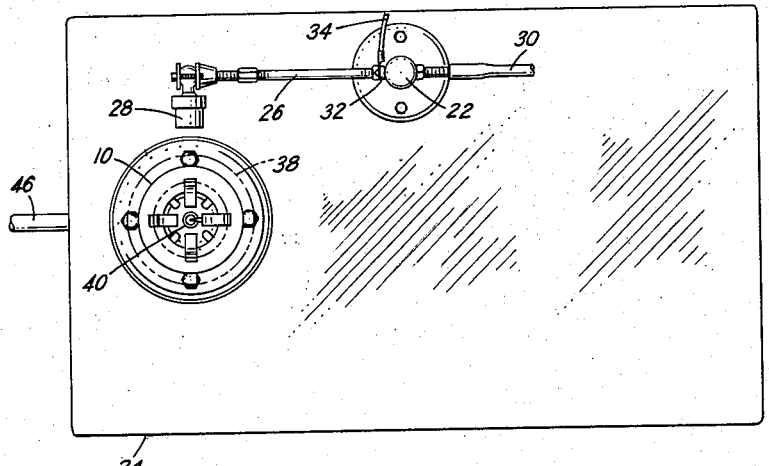

March 17, 1959    K. H. BUTLER ET AL    2,878,137

METHOD OF COATING ELECTRIC LAMP ENVELOPES

Filed March 30, 1956

INVENTORS
KEITH H. BUTLER
HORACE H. HOMER
MARTHA J. THOMAS

BY Joseph C. Ryan
ATTORNEY

2,878,137

METHOD OF COATING ELECTRIC LAMP ENVELOPES

Keith H. Butler, Marblehead, Horace H. Homer, Arlington, and Martha J. Thomas, Brookline, Mass., assignors to Sylvania Electric Products Inc., Salem, Mass., a corporation of Massachusetts Application March 30, 1956, Serial No. 575,110

1 Claim. (Cl. 117—17)

This invention relates to the manufacture of electric lamps and more particularly to the manufacture of electric lamps provided with a phosphor coating on its inner surface.

The preparation of a phosphor and its application to a lamp envelope is usually accomplished by grinding the phosphor with a high viscosity dispersion of nitrocellulose in acetone and then diluting this phosphor suspension with additional solvent until suitable for coating. The diluted suspension is then flowed over the inner surface of the lamp envelope until a uniform coating is obtained. This coating is then dried and the envelope is heated to burn off the nitrocellulose. One of the disadvantages of this method is that the combustion of the nitrocellulose in close contact with the phosphor may adversely affect the ability of the phosphor to fluoresce, due to oxidation or reduction of the activator in the phosphor. Another disadvantage is that in many cases a small amount of unburned carbon still remains. This is particularly true in the case of lamp envelopes having but one open end, such as the envelope used as the outer jacket of a high pressure mercury vapor lamp, for example.

We have found that excellent phosphor coatings may be obtained by an electrostatic precipitation of a treated phosphor on the wall of a lamp envelope from a stream of air in which the phosphor is suspended. However, we have also found that there are certain essential requirements in the preparation and treatment of the phosphor and in its application to the lamp envelope which must be met in order to obtain a satisfactory coating.

To obtain a satisfactory coating, the phosphor must be free of large aggregates, both during its manufacture and its application to the lamp envelope. Elimination of large aggregates is usually effected by wet or dry milling of the phosphor. Although the phosphor may be prepared by ball milling in a liquid as well as by dry milling, if the former method is employed, care must be exercised to make sure that the phosphor is completely free of moisture before it is used, in order to prevent undesirable caking of the phosphor particles. Even when the phosphor is prepared by dry milling, there is a tendency for the phosphor particles to stick to one another during the milling operation. It has also been noted that, during electrostatic precipitation of the phosphor, even though the phosphor is free of large aggregates, the attractive forces between phosphor particles tend to cause the particles to stick to one another, with the result that a coating of inferior quality is obtained.

We have found that the tendency of the phosphor particles to cake during the preparation of the phosphor and during its application by electrostatic precipitation may be corrected by a treatment consisting of the addition to the phosphor of a small amount of an inert additive of very fine particle size. The additive employed should be one which does not materially absorb the ultraviolet radiation to which the phosphor responds; it should not materially absorb the visible light from the lamp; it should be one which is chemically inert with respect to the phosphor employed; it should be one which is unaffected by exposure to ultraviolet radiation; it should be one which is not adversely affected at temperatures normally encountered in lamp preparation and operation; and it should not be appreciably hygroscopic. Silicon dioxide and aluminum oxide meeting these requirements will give good results.

Satisfactory results may be obtained when the quantity of the additive is between about .5% and about 10% by weight of the phosphor. When less than about .5% is used, there does not appear to be enough present to overcome the caking tendency mentioned above. When amounts in excess of about 10% are employed, a selective coating of the additive on the lamp envelope is noted and the light output of the phosphor coating decreases substantially because of dilution effects.

The additive should have a very fine particle size. We prefer to use additives with an average particle size below a micron. We have found that the finer the particle size, the more effective the additive is in minimizing the caking tendencies both during phosphor preparation and during electrostatic precipitation.

In addition to the requirements noted above for the treated phosphor and the method of its preparation, there are also certain essential requirements in the application of the treated phosphor to the lamp envelope which must be met, in order to obtain a satisfactory coating. In order to insure proper adhesion of the phosphor particles to the lamp envelope, the envelope should be heated to a temperature sufficient to make the glass slightly conductive. The exact temperature depends in part on the type of glass and wall thickness of the envelope. Although the glass should be heated to a temperature sufficient to give it the degree of conductivity desired in order that adhesion may be effected, too much heat will increase the conductivity to a point where some of the charged phosphor particles are repelled and thus adhesion is prevented.

Since the phosphor particles retain a slight residual charge after they are precipitated onto the lamp envelope, this charge should be removed in order to improve the adhesion. This is accomplished before the lamp envelope has cooled appreciably, by exposing the lamp envelope to a very humid atmosphere, such as a steam jet for example. This exposure must be of sufficient duration to insure complete contacting of the coating by the steam. In effecting this exposure to a humid atmosphere, care must be exercised to make sure that steaming is adequate to effect a substantial improvement in the adhesion and yet not excessive to the point of washing off the phosphor particles. After steaming, the coated lamp envelope should be thoroughly dride to insure the removal of all moisture which woud tend to vaporize during lamp sealing and subsequent operation of the lamp.

Figure 2:
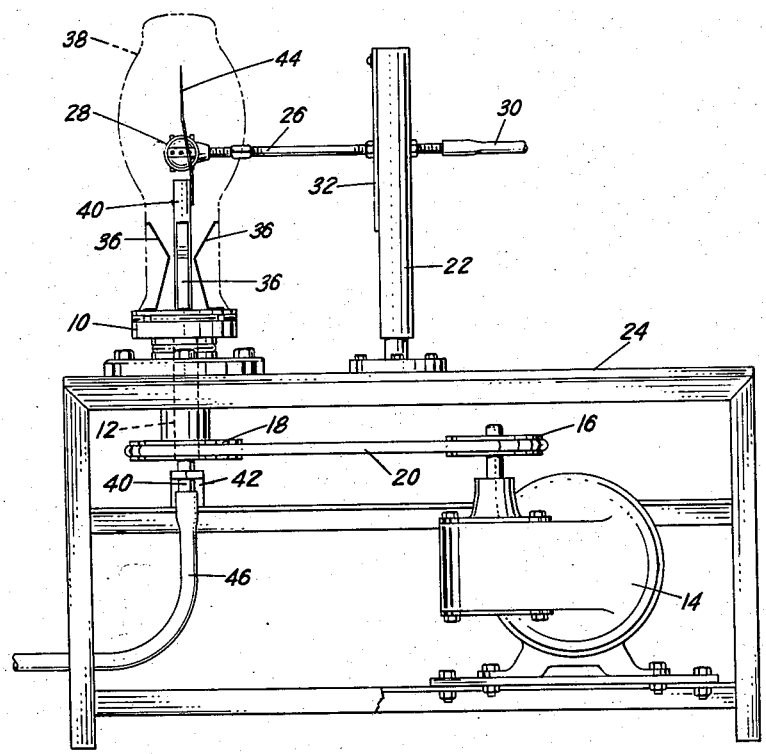

In the accompanying drawing, Figure 1 is a plan view of an apparatus with which the method of this invention may be employed, and Figure 2 is a side elevational view of the apparatus of Figure 1.

The apparatus illustrated in the drawing comprises a rotatable bulge-supporting head 10 mounted on a shaft 12 which is driven by motor 14 through pulleys 16 and 18 and belt 20. An insulating standard 22 on table 24 supports metal burner tube 26. Burner 28 is mounted on one end of tube 26 and the other end of tube 26 is connected to a supply of a combustible gaseous mixture through tubing 30. Burner 28 is electrically connected to a high voltage D. C. power supply through metal tube 26, metal plate 32 mounted on insulating standard 22, and wire 34, one end of which is attached to plate 32 and the other end of which is connected to the power supply (not shown).

The head 10 is provided with resilient fingers 36 which retain bulb 38 in position on the head. A stationary feeding tube 40, supported by collar 42, extends through the head 10 and into bulb 38. A wire electrode 44 is attached to the upper end of feeding tube 40 and serves as the ground electrode. The lower end of feeding tube 40 is connected, by flexible rubber or plastic tubing 46, to an apparatus for furnishing a supply of phosphor particles suspended in air, such as the smoke generator shown and described in the copending application of A. H. Nimblett, Jr., Serial No. 566,540, filed February 20, 1956, for example.

Examples of phosphor-additive mixes and their preparation which have been employed successfully will now be described. A sample of tin-activated calcium zinc orthophosphate was ground in acetone for two hours, filtered, and dried at about 105° C. overnight. Five hundred grams of this phosphor were then mixed with about 30 grams of superfine alumina (sold under the trade name of Alon C) by rolling in a bottle. This mixture was then placed in the smoke generator illustrated and described in the above-identified co-pending application of Nimblett, Jr., and used to coat the outer glass envelope employed in the manufacture of 400 watt high pressure mercury vapor lamps.

In another instance, a sample of manganese activated magnesium fluogermanate was grounded for about six hours in acetone denatured ethyl alcohol. After filtering and drying, this phosphor was dry blended with about 2% weight of superfine silica (sold under the trade name of Cabosil). This mixture was then placed in the smoke generator illustrated and described in the referenced application and used to coat the outer glass envelope employed in the manufacture of 100 watt high pressure mercury vapor lamps.

In each instance, the envelope coated was a soft lime glass heated to a temperature of between about 100° C. to about 125° C., thus making the glass slightly conductive during the electrostatic precipitation of the phosphor particles. The air stream carrying the phosphor from the smoke generator is introduced into the bulb 38 through flexible tubing 46 and feeding tube 40, and the bulb-supporting head 10 is rotated, at about 50 R. P. M. for example, by the motor 14 through pulley 16, belt 20, pulley 18 and shaft 12. During their travel from the smoke generator, the phosphor particles become charged by frictional electrification and thus have a charge of static electricity when they enter the feeding tube 40. Due to this static charge they are well dispersed in the air stream essentially as individual particles. Electrical contact to the outer surface of the bulb is established by utilizing the conductive property of a gas flame playing on the bulb, the flame emanating from burner 28 which is connected to a high voltage D. C. power supply through burner tube 26, plate 32 and wire 34. The connection of this power supply between the gas burner 28 and the wire electrode 44 provides a strong electrostatic field between the bulb wall and the electrode 44 near the center of the bulb. The charged particles of phosphor leaving the feeding tube 40 move, under the influence of the electric field, to the wall of the bulb where they lose their charge and adhere to the wall.

Since a slight residual charge remains on the phosphor particles after they have been deposited on the wall of the bulb, the adhesion of the phosphor coating is affected adversely. This residual charge may be removed and the adhesion improved by exposing the bulb to a very humid amosphere as described above. The coated bulb is then dried thoroughly to effect removal of moisture which would tend to vaporize and adversely affect the coating during subsequent lamp manufacturing operations.

What we claim is:

The method of providing the inner wall of an electric lamp envelope with a phosphor coating which comprises: electrostatically precipitating on the inner wall of a lamp envelope particles of a mechanical mixture of a phosphor and an inert additive, selected from the group consisting of silicon dioxide and aluminum oxide, having an average particle size below a micron, and being between about .5% and about 10% by weight of the phosphor; exposing the particles on the inner wall of the lamp envelope to a humid atmosphere to remove the residual electrical charge therefrom; and drying the lamp envelope and the particulate coating to remove the moisture therefrom.

References Cited in the file of this patent

UNITED STATES PATENTS

| | | |
|---|---|---|
| 2,331,306 | Casellini | Oct. 12, 1943 |
| 2,538,562 | Gustin et al. | Jan. 16, 1951 |
| 2,682,478 | Howse | June 29, 1954 |

FOREIGN PATENTS

| | | |
|---|---|---|
| 686,101 | Great Britain | Jan. 21, 1953 |